United States Patent
Dahlstrom

[15] 3,645,212
[45] Feb. 29, 1972

[54] STRAPHANGERS DEVICE

[72] Inventor: Selim V. Dahlstrom, 143 Prospect St., Waldwick, N.J. 07463

[22] Filed: Mar. 4, 1970

[21] Appl. No.: 19,149

[52] U.S. Cl. ................................105/354, 287/99, 294/26
[51] Int. Cl. .......................................B65g 7/12, B61d 49/00
[58] Field of Search ...............74/547; 287/99, 100; 248/351, 248/354 P; 135/15 PO; 294/26, 53.5, 57; 105/354

[56] References Cited

UNITED STATES PATENTS

| 584,223 | 6/1897 | Hammer | 105/354 |
|---|---|---|---|
| 1,679,513 | 8/1928 | Brown | 287/99 |
| 2,214,660 | 9/1940 | Darling | 294/26 |
| 2,601,999 | 7/1952 | Sly | 294/26 |
| 2,679,429 | 5/1954 | Martin | 294/26 |

*Primary Examiner*—Arthur L. La Point
*Assistant Examiner*—Richard A. Bertsch

[57] ABSTRACT

The device for use by a standing traveler in subways, buses or other vehicles. The device serves to aid a person of short stature to reach the overhead strap or support bar in vehicle. The device includes a hooked rod and a hingeable second rod and the handle grip, the hook serving to engage the overhead strap or support bar in the vehicle. The device also includes an attached chain and pin, the pin serving to lock the two bars in alignment and also serves to lock the two bars when in the folding compact position for carrying.

1 Claim, 4 Drawing Figures

PATENTED FEB 29 1972 3,645,212

INVENTOR.
Selim V. Dahlstrom

STRAPHANGERS DEVICE

This invention relates to hook devices and the like and more particularly to strapholders device.

It is therefore the main purpose of this invention to provide a straphangers device which will greatly help a person of short stature to reach the overhead strap or support bar in a vehicle.

Another object of this invention is to provide a straphangers device which will be of sanitary value, in that it prevents direct contact with objects usually handled by other passengers.

A further object of this invention is to provide a device of the type described which when made in various lengths which may be folded or telescoped for a means in carrying in the pocket, purse or bag etc.

Other objects of the present invention are to provide a straphangers device which is simple in design, inexpensive to manufacture, rugged in construction and easy to use and effective in operation.

These and other objects will become readily evident upon study of the following specification together with the accompanying drawing wherein.

Figure 1:
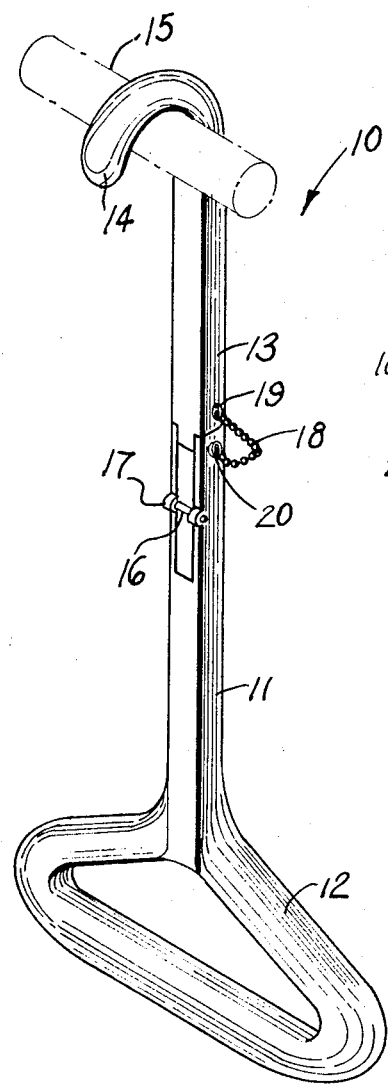
FIG. 1 is a respective view of the present invention shown with the two bar members in alignment with each other and the hook portion engaging the bar which is shown in phantom lines.
Figure 3:
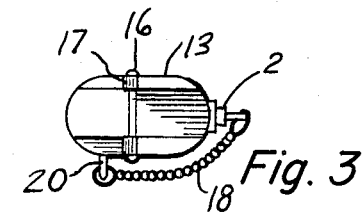
FIG. 3 is a top plan view of FIG. 2.
Figure 2:
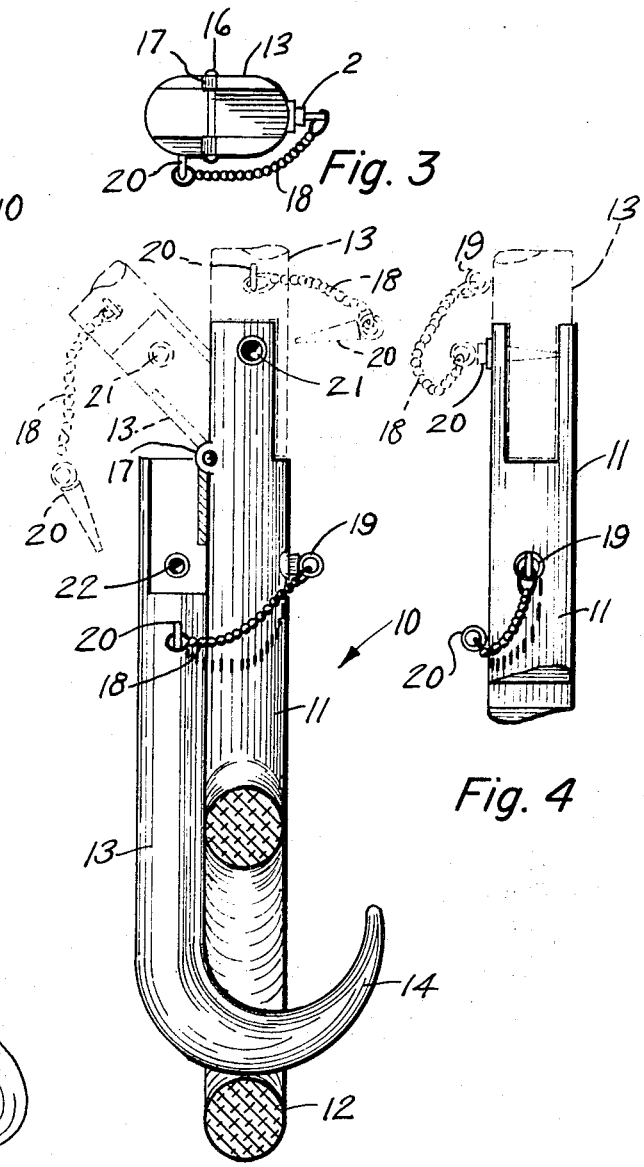
FIG. 2 is an enlarged side view of the invention shown in its full force and lock position.
Figure 4:
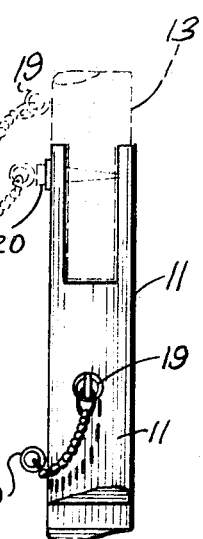
FIG. 4 is a segmentary vertical view of the device shown in elevation.

According to this invention, the straphangers device 10 is shown to include a bar 11 having an open handle 12. The second antibital bar 13 is provided with a hook 14 for engaging the bar 15 or the strap (not shown) while in a transportation vehicle. Bars 11 and 13 are secured by means of the "hinge pin" 16 carried within spaced-apart lugs 17. A chain 18 is secured at one end of an eye 19 of bar 13 and the other end of chain 18 is secured to a pin 20, pin 20 serving to lock bars 11 and 13 in alignment with each other in position and pin 20 also provides a means of securing bars 11 and 13 in the folding position for carrying. When the bars 11 and 13 are in alignment with each other for gripping bar 15, pin 20 is then received within opening 21 of bar 11 and opening 22 of bar 13 thus rendering bars 11 and 13 rigid. When not in use, the straphanger device is retained in a collapsed folded over position by the pin 20 being fitted through an opening on a side of bar 13, as shown in FIG. 2, so that the device cannot open up.

It shall be noted that when device 10 is in a folded and locked position, the hook 14 is received within the handle 12 for further compactness.

In use, pin 20 is removed from the bar 13 and 13 pivoted upward to align with bar 11, after which pin 20 is placed into opening 21 that is in alignment with opening 22 of bar 13, pin 20 thus serving to lock bars 11 and 13 in alignment with each other in order that hook 14 may be engaged with bar 15.

What I now claim is:

1. A straphanger device for use by a standing passenger in a transport vehicle comprising in combination a pair of bars pivotally connected together, a first of said bars being formed at one end into a U-shaped hook, the second of said bars having a closed loop formed at one end to serve as a handle, the opposite ends of said bars being pivotable about a transverse hinge pin fitted through said bars; said bar having said loop having an extension at said end fitted with said hinge pin, said extension having a transverse lockpin opening, said other bar having said hook having likewise a transverse lockpin opening, said lockpin openings being an equal distance from said hinge pin so that they can be aligned, said aligned lockpin openings receiving a lockpin therethrough so to secure said bars in an extended position, said lockpin being tethered to one end of a chain that at its other end is secured to an eye affixed to said bar having said loop, said hook being in a plane at right angle to a plane of said loop so that when said bars are pivoted into a closed position said hook is received into said loop.

* * * * *